Dec. 4, 1928.
D. SANDFORD
1,693,619
NOISELESS CHECK VALVE
Filed May 26, 1923
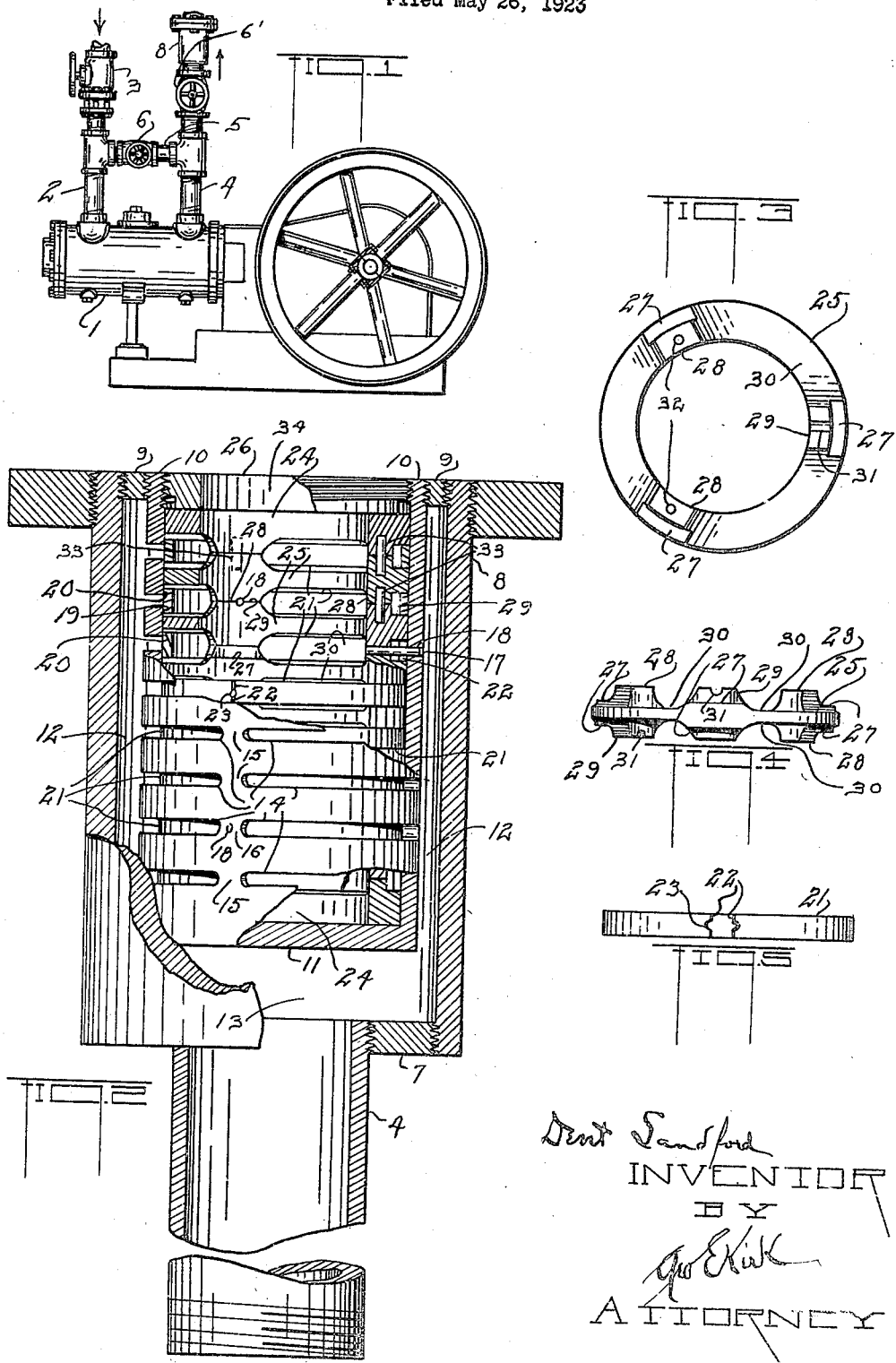

Patented Dec. 4, 1928.

1,693,619

UNITED STATES PATENT OFFICE.

DENT SANDFORD, OF TOLEDO, OHIO.

NOISELESS CHECK VALVE.

Application filed May 26, 1923. Serial No. 641,562.

This invention relates to valves, especially of large port area for quick quiet action.

This invention has utility when incorporated in check valves, more particularly for the line from the compressor to the receiver in refrigeration installations.

Referring to the drawings:

Fig. 1 shows an embodiment of the valve in an ammonia compressor installation;

Fig. 2 is a detail view on an enlarged scale, with parts broken away, of the check valve of the invention as shown in Fig. 1;

Fig. 3 is a view in elevation looking axially of one of the spider rings of the valve;

Fig. 4 is an edge view of the spider ring of Fig. 3; and

Fig. 5 is an edge view of a port closing split ring.

Compressor 1 is shown as having intake line 2 extending downward past valve 3. From this compressor 1 upwardly extends outlet line 4 having cross-connection or by-pass line 5 to the intake line 2. A valve 6 in this by-pass line 5, when closed, precludes by-pass operation. Above the by-pass line 5, the outlet line 4 has an embodiment of the valve of the invention herein. This outlet line 4 extends toward the receiver.

In starting the compressor 1, the valve of the invention is normally closed against flow of condensation or gas toward the compressor. The valve 6 is opened, as well as the valves 3 and 6'. As the compressor gets up to speed, the by-pass valve 6 is closed, and regular compressor operation occurs.

On the outlet line 4 is mounted bushing 7, to which is connected in alignment with the pipe or line 4, outer housing 8. The end of the housing 8 remote from the line 4 has bushing 9 for mounting sleeve 10 having closed end 11 toward the line 4. Between the inner wall of the housing 8 and the outer wall of the sleeve 10 is an annular chamber 12 having communication by way of chamber 13 with the line 4.

This sleeve 10 has a plurality of annular series of openings 14 providing ports. These openings 14 of an annular port are spaced by bridge portions 15, 16. As herein shown there are three openings 14 for each annular port. The bridge portions 16 have radial openings 17 for pins 18. As shown these pins 18 for the succeeding ports progress about the sleeve 10. The inner side of the sleeve 10, upon opposite sides of the openings 14, has for each port, a pair of endless seats 19, 20, for a valve closure, herein shown as a split ring 21. Opposing ends 22 of the rings 21 have seats or notches 23 for collapsed position of the ring engagement about a pin 18. While the normal or expanded position of the ring 21 to snugly fitting position against the seats 19, 20, may open up or space the ends 22 to permit of slight arc shifting of the ring 21, the pin 18 holds such space wholly within the region of the bridge 16. Thus there may not be rotation of the ring 21 to have its split portion open a port by coming into register with such port.

In this ported sleeve 10 are assembled terminal spider rings 24, spaced by intermediate spider rings 25, all held in snug assembly in such sleeve 10, by ring 26 as a nut engaging the sleeve 10. Each spider ring has side guide portions 27 adjacent abutting lugs 28, 29, there being clearance regions 30, between the seats or guide portions 27. Radial notches 31 in a pair of opposing lugs 28 as abutting together from a recess for valve closure ring directing pin 18, thereby serving to maintain the spider legs or lugs in register with the bridge portions 15, 16, for maximum free flow port regions in this valve structure. The lugs 29 have seats 32 with which may engage pins 33 for insuring proper angular assembly of the successive spider rings in providing the seats for the pins 18 as well as the registry with the bridge portions, stepped about in the sleeve 10.

The ring closures 21 may be of machined cast iron. Within the spider ring assembly, is valve chamber 34, normally of receiver pressure, acting to maintain the rings 21 in port closing position.

In a compact region, there is provided a large port area, capable of passing a large volume of flow in most rapid pulsations, independently of pounding or hammering the life out of the valve closing elements. The elements are independently operable. Condensation will not act disastrously thereto. The guide portions 27 direct the rings 21 for travel at all times centrally of the openings or slots 14. The lifting or unseating of the rings 21 by compressor action in the line 4 occurs quietly, and with but very slight movement of the respective rings 21, there is exposed a large port area. In practice at high speeds of pulsations, the rings 21 may be poised against actual seating, but are so sensitive to the pressure fluctuations as to preclude any back flow from the receiver. This check valve in its action for adequate and quick response against loading the compressor unduly, is effective at all times to hold condensation from getting back to the compressor, and thus avoids disaster from incompressible liquid interferences.

What is claimed and it is desired to secure by Leters Patent is:

1. A compressor check valve embodying a chamber having an end opening, a concentric shell as a closure for the opposite end of the chamber and protruding thereinto, said shell having annular ports in series in communication with said chamber, there being bridge means between said ports provided with projections, a split ring within the shell for each annular port, said ring oppositely extending from said projections, abutting spacers for the rings engaging said projections, and pins staggered as to said projections for anchoring the spacers together.

2. A compressor check valve embodying a chamber having an end opening, a concentric shell as a closure for the opposite end of the chamber and protruding thereinto, said shell having annular ports in series in communication with said chamber, there being bridge means between said ports provided with projections, a split ring for each annular port, said ring oppositely extending from said projections, abutting spacers for the rings engaging said projections, pins staggered as to said projections for anchoring the spacers together, and a nut engaging the shell for locking the spacers therein.

In witness whereof I affix my signature.

DENT SANDFORD.